(12) United States Patent
Tsai et al.

(10) Patent No.: US 8,185,516 B2
(45) Date of Patent: May 22, 2012

(54) METHOD FOR FILTERING FILE CLUSTERS

(75) Inventors: Hong-Yang Tsai, Taipei (TW);
Hung-Hsiang Ku, Taipei (TW);
Hsun-Hsueh Cho, Taipei (TW)

(73) Assignee: Esobi Inc., George Town (KY)

( * ) Notice: Subject to any disclaimer, the term of this patent is extended or adjusted under 35 U.S.C. 154(b) by 158 days.

(21) Appl. No.: 12/773,619

(22) Filed: May 4, 2010

(65) Prior Publication Data

US 2010/0293155 A1    Nov. 18, 2010

(30) Foreign Application Priority Data

May 13, 2009   (TW) ............................... 98115929 A

(51) Int. Cl.
*G06F 17/30* (2006.01)
(52) U.S. Cl. ........................................ 707/711; 707/797
(58) Field of Classification Search .................. 707/711, 707/797
See application file for complete search history.

(56) References Cited

U.S. PATENT DOCUMENTS

| | | | |
|---|---|---|---|
| 6,035,297 A * | 3/2000 | Van Huben et al. | 707/695 |
| 6,237,006 B1 * | 5/2001 | Weinberg et al. | 707/797 |
| 6,339,767 B1 * | 1/2002 | Rivette et al. | 707/781 |
| 6,820,076 B2 * | 11/2004 | Bailey et al. | 707/770 |
| 7,136,868 B2 * | 11/2006 | Sonkin et al. | 707/754 |
| 7,213,024 B2 * | 5/2007 | Keith, Jr. | 707/797 |
| 7,340,454 B2 * | 3/2008 | Wu et al. | 707/711 |
| 7,373,351 B2 * | 5/2008 | Wu et al. | 707/711 |
| 7,392,250 B1 * | 6/2008 | Dash et al. | 707/776 |
| 2009/0259646 A1 * | 10/2009 | Fujita et al. | 707/5 |
| 2009/0307205 A1 * | 12/2009 | Churchill et al. | 707/5 |

* cited by examiner

*Primary Examiner* — Kim Nguyen
(74) *Attorney, Agent, or Firm* — Morris Manning & Martin LLP; Tim Tingkang Xia, Esq.

(57) ABSTRACT

A method for filtering file clusters is presented. In the method, a plurality of advanced filter actions with different filter conditions and independent from each other is performed on an obtained main result file. Thereby, a history record of each advanced filter is kept, and the history record of each advanced filter and respective search results are presented on a target interface in a presentation mode of opening a new page or updating an index list.

11 Claims, 12 Drawing Sheets

METHOD FOR FILTERING FILE CLUSTERS

CROSS-REFERENCE TO RELATED APPLICATIONS

This non-provisional application claims priority under 35 U.S.C. §119(a) on Patent Application No(s). 098115929 filed in Taiwan, R.O.C. on May 13, 2009, the entire contents of which are hereby incorporated by reference.

BACKGROUND OF THE INVENTION

1. Field of Invention

The present invention relates to a method for filtering data, and more particularly to a method for filtering file clusters.

2. Related Art

Nowadays due to the rapid growth of the amount of data, it becomes a problem in urgent need of solutions for modern people to find required files from a large number of data files. Therefore, many manufacturers provide file search software, through which not only the desired data can be found at a local end, but also the required data files can be found in the network.

Currently, a search engine in the network may also achieve a function similar to advanced filter. However, in each action, a keyword needs to be input again to obtain data from a server of the search engine, resulting in a waste of time. For example, in a well-constructed search engine in the network, it is assumed that 100 search results are obtained by inputting "NBA". An advanced search function of the search engine is used to filter the obtained results by further inputting an advanced filter keyword in the 100 search results of "NBA", for example, "Yao-ming" is further input to obtain 50 filtered results through the advanced search. However, at this time, the previous 100 search results of "NBA" are already cleared and only 50 results obtained through the advanced search of "Yao-ming" are left. If a user intends to search other keywords from the 100 search results of "NBA", the user needs to input "NBA" again to obtain new search results before making the advanced search once again. As such, pages and data of the found results cannot be stored, and data blocks cannot be divided, so that it is impossible for the user to select a single data block for the advanced filter action.

Besides, the most widely used Google search engine is unable to change main search data blocks, and thus the Google search engine can only perform a further search. For example, "NBA" is input in the Google search engine and it is assumed that 100 search results are obtained. If data containing "Yao-ming" needs to be obtained from the 100 results, keywords "NBA Yao-ming" must be input in the Google search engine again to obtain data of "NBA" plus "Yao-ming".

Moreover, most of the network search engines provide an "all these words" function similar to filter in advanced search. However, the filtered results do not conform to the filter conditions completely. For example, a combination of three keywords "NBA Coby Laker" is typed in the field of "all these words" for search. The found results include all data that partially and completely conforms to the filter conditions. For example, a plurality of data that merely conforms to the parts such as "NBA Coby", "NBA Laker", and "Coby Laker" but is not the target of the advanced filter is found, instead of the desired data that completely conforms to "NBA Coby Laker". Therefore, the advanced filter lacks in accuracy and the found data is more disordered.

In addition, currently a user is also unable to decide new filter conditions from a filter history. For example, first-layer filter results with "NBA" are used for illustration. When the user inputs a new filter condition "Coby", search results containing "Coby" are filtered from the results of "NBA". If the results of "Laker" are filtered again with "NBA", the original search results of "Coby" are cleared.

In an existing widely applied website search engine (for example, Google, Yahoo, and MSN), upper-layer filter results can be backtracked only once. If filter with different filter conditions is performed on the upper-layer filter results, the original filter conditions are refreshed.

SUMMARY OF THE INVENTION

In order to solve the above problems, the present invention is a method for implementing advanced filter on file clusters. In the method, advanced filter processing with different conditions and independent from each other is performed on an obtained main result file through a target interface at a local end in a presentation mode of opening a new page or updating an index list. Thereby, a history record of search results of each advanced filter is kept, and the history record of each advanced filter and respective search results are presented on the target interface in a presentation mode of opening a new page or updating an index list, so that a user can obtain a complete filter history and keep all the search results for ease of comparison and convenience of operations.

The target interface may be a web browser or a designed visual presentation platform (that is, an application).

The main result file may be a set of, for example, search results obtained from the search engine or any text file.

A preferred technical solution of the present invention comprises the following steps.

In Step S110, a main result file is obtained from a data source end.

In Step S120, each content data in the main result file is acquired and stored as a temporary set.

In Step S130, a new file page is opened on a target interface at a local end and content of the temporary set is displayed in the file page.

In Step S140, a random file page is selected from the target interface as a main filter page.

In Step S150, advanced keyword filter is performed on the main filter page, so as to obtain a filter result file.

In Step S160, each data in the filter result file is acquired and stored as another temporary set, and Steps S130 to S160 are repeated.

The data source end in Step S110 is a source for providing the main result file. For example, at the data source end, a user or a server end may upload an unorganized disordered list or data to serve as the main result file. In another preferred embodiment of the present invention, search results of a web search engine are obtained directly to serve as a main result file and subsequent advanced keyword filter is performed thereon.

In Step S130, each file page in the target interface at the local end is corresponding to a respective temporary set and content data of the corresponding temporary set is displayed in each file page. The temporary sets are correlated to each other. However, the temporary sets are corresponding to independent file pages and data blocks (as for memory locations), respectively.

In Steps S140 to S160, after the main filter page is selected, an advanced filter action is further performed on the content of the current temporary set with a new keyword and another new temporary set and a new file page are generated and displayed.

Steps S110 to S160 form a loop of actions. A first-time advanced filter is performed on the content of the temporary set in the target interface at the local end (that is, a first file page is generated), and another new temporary set is obtained by division (that is, another file page is generated). Further, a random file page (for the data content that belongs to the file page) is selected as a range of the advanced filter, and a plurality of independent file pages is continuously filtered and divided until the user finishes the loop.

Each temporary set is stored respectively and independently in a memory section at the local end, and the temporary set is in a data structure of an array, a table, or other forms.

According to another preferred embodiment of the present invention, a step of establishing an index set is further provided among the above steps. Specifically, a keyword in each round is recorded in sequence in the present invention after filter is implemented each time, the current keyword and the previous keyword are also recorded in sequence, and the recorded keywords are collected to form an index set. Through the step of establishing the index set, the content of the corresponding temporary set can be updated continuously and presented in a main file page with no need to open a new file page.

In a method according to another preferred embodiment of the present invention, a main search result file (found result data) of a data source end (a website search engine) is obtained. The method comprises the following steps.

In Step S210, a main result file (search results) is obtained from a website search engine.

In Step S220, each data in the main result file is acquired and then organized and stored as a temporary set.

In Step S230, at least a keyword is established corresponding to the temporary set and the keyword is written in an index set.

In Step S240, a keyword index list is established and content of the index set is presented in the keyword index list.

In Step S250, a main file page is opened on a target interface at a local end and content of the temporary set is displayed in the main file page.

In Step S260, a random keyword already existing in the keyword index list is selected, the content of the temporary set corresponding to the keyword is presented in the main file page, and the main file page is used as a main filter page for an advanced filter action.

In Step S270, advanced keyword filter is performed on the main filter page to obtain a filter result file.

In Step S280, each data in the filter result file is acquired and stored as another temporary set.

In Step S290, at least a keyword is established corresponding to the temporary set, the keyword is written in the index set, and Steps S240 to S290 are repeated.

The content of the keyword index list may be presented in any mode such as a drop-down menu, a tree structure menu, or a column list. Each keyword in the keyword index list is corresponding to a respective temporary set, and the main file page displays content of the selected main filter page (the content of the temporary set corresponding to the keyword selected in the keyword index list). The temporary sets corresponding to the keywords in each index set are data blocks that are correlated but independent from each other.

Therefore, a user can update the content of the corresponding temporary set continuously in the main file page by selecting the existing keyword (or keyword combination) and present the content, so that the main file page serves as a main filter page for advanced filter and a subsequent advanced filter action is performed thereon.

As described above, a new file page is opened on a target interface (a web browser or a designed visual presentation platform) to present respective advanced filter results and another advanced filter can be performed after a file page (which is defined as a main filter page) is randomly selected. Moreover, in another embodiment, the content of the main file page is updated by establishing a keyword index list for advanced keyword filter, so that the user can save the history records and search results of the filter, and acquire keywords (or keyword combinations) from the filter histories for comparison with the search results. After finishing the loop, the user may further select to store all the history records and search results or delete all the temporary sets generated in the steps directly.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The method provided in the present invention below may be realized through execution by a common computer comprising, but not limited to, computer equipment such as a personal computer, a notebook computer, a personal digital assistant (PDA), and a server. Persons skilled in the art can implement the present invention with the knowledge of the method described below according to the present invention. In addition, in the method of the present invention, history records and respective search results of each advanced filter are presented on a target interface (a web browser or a designed visual presentation platform (that is, an application)) in a presentation mode of opening a new page or updating an index list.

The method of the present invention is applicable for performing a plurality of advanced filter actions with different filter conditions and independent from each other on any file cluster (that is, a main result file). The file cluster may be search results generated by a web search engine and all results of each search are regarded as in the same file cluster. In the present invention, a main result file is obtained from a data source end 100. The data source end means that a file cluster (a main result file) is obtained from a website search engine or a remote server or a computer at a local end of a user. In the illustration of the following embodiments, search results obtained from a website search engine are taken as an example, and the search results are defined as a main result file.

Figure 1A:
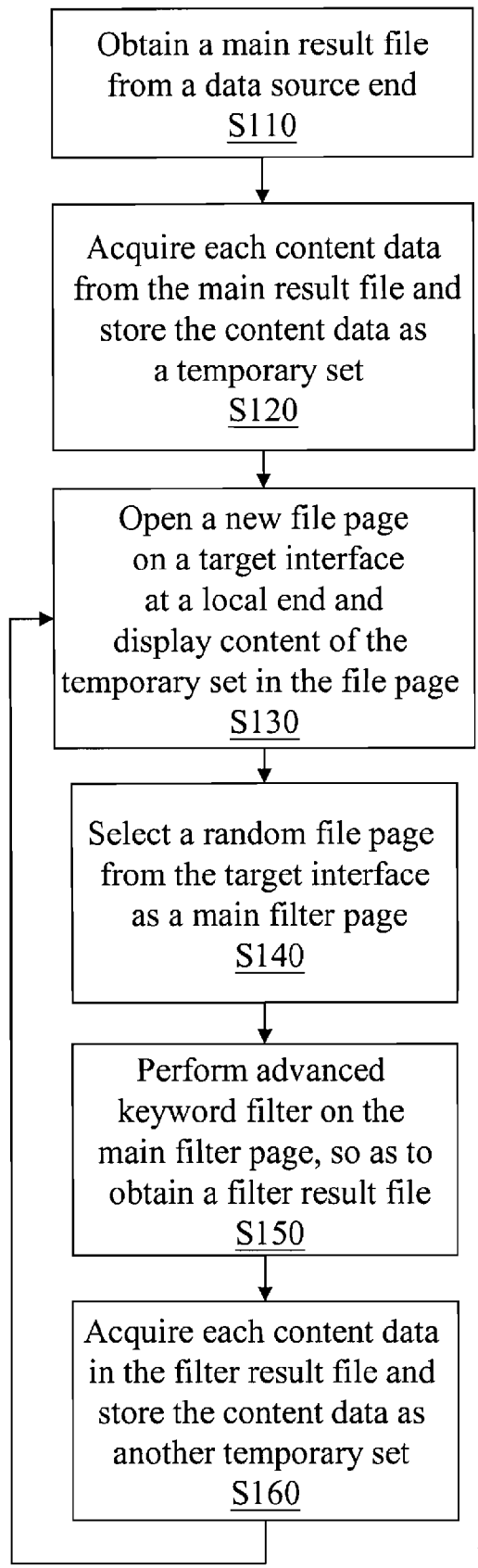
FIG. 1A is a schematic view of steps according to a preferred embodiment of the present invention.

In the following a schematic view of implementation steps of the present invention is illustrated. Referring to FIG. 1A, the method of this embodiment comprises the following steps.

In Step S110, a main result file is obtained from a data source end.

In Step S120, each content data in the main result file is acquired and stored as a temporary set.

In Step S130, a new file page is opened on a target interface at a local end and content of the temporary set is displayed in the file page.

In Step S140, a random file page is selected from the target interface as a main filter page.

In Step S150, advanced keyword filter is performed on the main filter page, so as to obtain a filter result file.

In Step S160, each content data in the filter result file is acquired and stored as another temporary set, and Steps S130 to S160 are repeated.

Figure 1B:
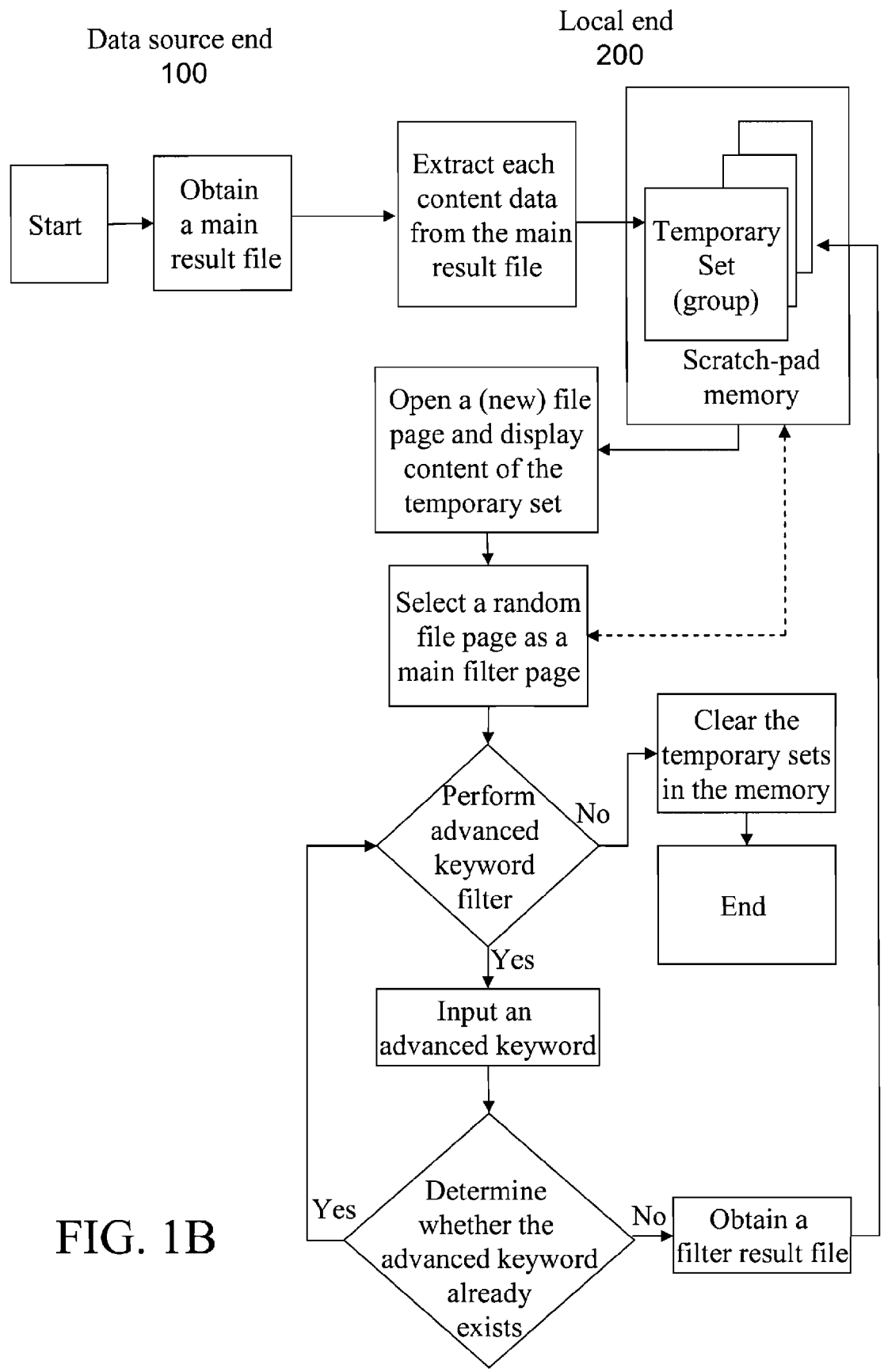
FIG. 1B is a schematic flow chart according to an embodiment of the present invention.

In order to illustrate the operation process and architecture of the present invention more clearly, reference is also made to FIG. 1B in addition to the steps in FIG. 1A.

A local end 200 means that steps of the present invention are performed on the target interface of the user, that is, the main result file is obtained from a website search engine or a remote server or a computer at a local end of a user (corresponding to Step S110). The data source end 100 means multiple sources such as the website search engine or the remote server or the computer at the local end of the user. In the illustration of the implementation mode, search results (the main result file) obtained from the web search engine (the data source end 100) are taken as an example, and a display frame on the target interface of the user (the local end 200) is used for illustration. In addition, the files in the main result file are not necessarily arranged already. In other words, the sequence of the files in the main result file is not necessarily corresponding to the search results after being arranged.

After the main result file is obtained (corresponding to Step S110), a title, an abstract, and a uniform resource locator (URL) of each data are first obtained from the main result file, and organized in sequence to form content data that satisfies processing conditions (corresponding to Step S120). The content data is then organized into a temporary set and the temporary set is stored in a scratch-pad memory in the computer at the local end 200. Each temporary set generated in the steps of the present invention is stored in an independent memory block respectively. Therefore, all the temporary sets are correlated but independent from each other. The temporary sets may be stored in a data structure of an array, a linked list, or other forms.

Next, a new file page is added in the target interface at the local end 200. The content of the temporary sets is displayed in the file page at the target interface (corresponding to Step S130). A keyword that belongs to each file page is displayed in a page label of each file page. For example, after Step S130 is performed, a page label of the first file page is marked as "predetermined filter condition".

The user selects a random file page from the existing file pages and defines the selected file page as a main filter page (corresponding to Step S140). Corresponding to Step S150, the user inputs a new advanced keyword through a keyword input field, so as to perform advanced keyword filter on the main filter page. It should be noted that, the filter is performed on the temporary sets that belong to each file page in the present invention. The content data that satisfies the advanced keyword is then acquired. As the content data of each file is already processed in Step S120, this step does not need to be repeated in the process of the advanced keyword filter, and only the content data that satisfies the new keyword needs to be acquired and stored in a new temporary set. In the present invention, another block is divided from the memory, and the new temporary set is stored in the newly divided memory block. In other words, each temporary set in the memory does not have the same location.

Therefore, in the present invention, the history of each advanced filter is recorded in real time and the filter of other different keywords is performed in the recorded history. After the advanced keyword filter is performed each time, a new file page is added in the target interface and the new temporary set obtained in Step S130 is displayed in the newly added file page (corresponding to Step S160). In other words, Steps S130 to S160 form a loop of actions. A first-time advanced filter is performed on the content of the temporary set in the target interface (that is, a first file page is generated). The temporary set of the first file page is then divided to obtain another new temporary set (that is, another file page is generated). Further, a random file page (for the data content that belongs to the file page) is selected as a range of the advanced filter, and a plurality of independent file pages is continuously filtered and divided. A label of the newly added file page may be marked as "advanced keyword" or "predetermined filter condition+advanced keyword". When the user selects any one of the file pages, the content data of the selected file page is displayed in the frame of the target interface. Specifically, the corresponding content is displayed in a popup window or a display area further divided from the file page.

Finally, after the user finishes the operation (that is, the loop of steps in the present invention is completed), all the temporary sets generated in the steps of the present invention are deleted instead of occupying the resources of the scratch-pad memory at the local end 200. Moreover, as the filter condition (the advanced keyword) and the filter results (the main result file and the filter result file) of each advanced filter in the steps of the present invention are stored independently (in respective temporary sets), the history records and results of the filter actions in the whole process are stored. In this manner, when the target interface at the local end 200 is opened again, the user may decide whether to load the previous filter history, so as to reduce the time for repetitive filter, or when the target interface is opened again, the previous filter history is directly loaded, so as to facilitate the subsequent advanced utilization or comparison for reference.

In the following, in order to make the application of the present invention more comprehensible, a frame of a target interface 2 at the local end 200 (user) is adopted for further illustration. Referring to schematic views of display frames in FIGS. 2A to 2C, the content of each advanced filter with different conditions is presented in a plurality of independent file pages 22 on the target interface 2 at the local end 200 (for ease of illustration, reference is also made to the steps in FIG. 1A in the following).

Here, the target interface 2 is presented as a frame in a preferred embodiment of the present invention. In the target interface 2, a function block 21 is on the left side and the file pages 22 are on the right side. Each file page 22 is corresponding to a file page label 221. In the file page 22, an index block 222 is divided to place the content of the temporary set (corresponding to Steps S120 to S130, each content data with the organized title, abstract, and URL is presented in the index block 222). The content of the index block 222 in the file page 22 is displayed by clicking the file page label 221. When a random content data in the index block 222 is selected, the corresponding web page is linked and loaded in the file page 22 through the URL recorded in the content data. In addition, a keyword input field 211 and other functional options are set in the function block 21.

Figure 2A:
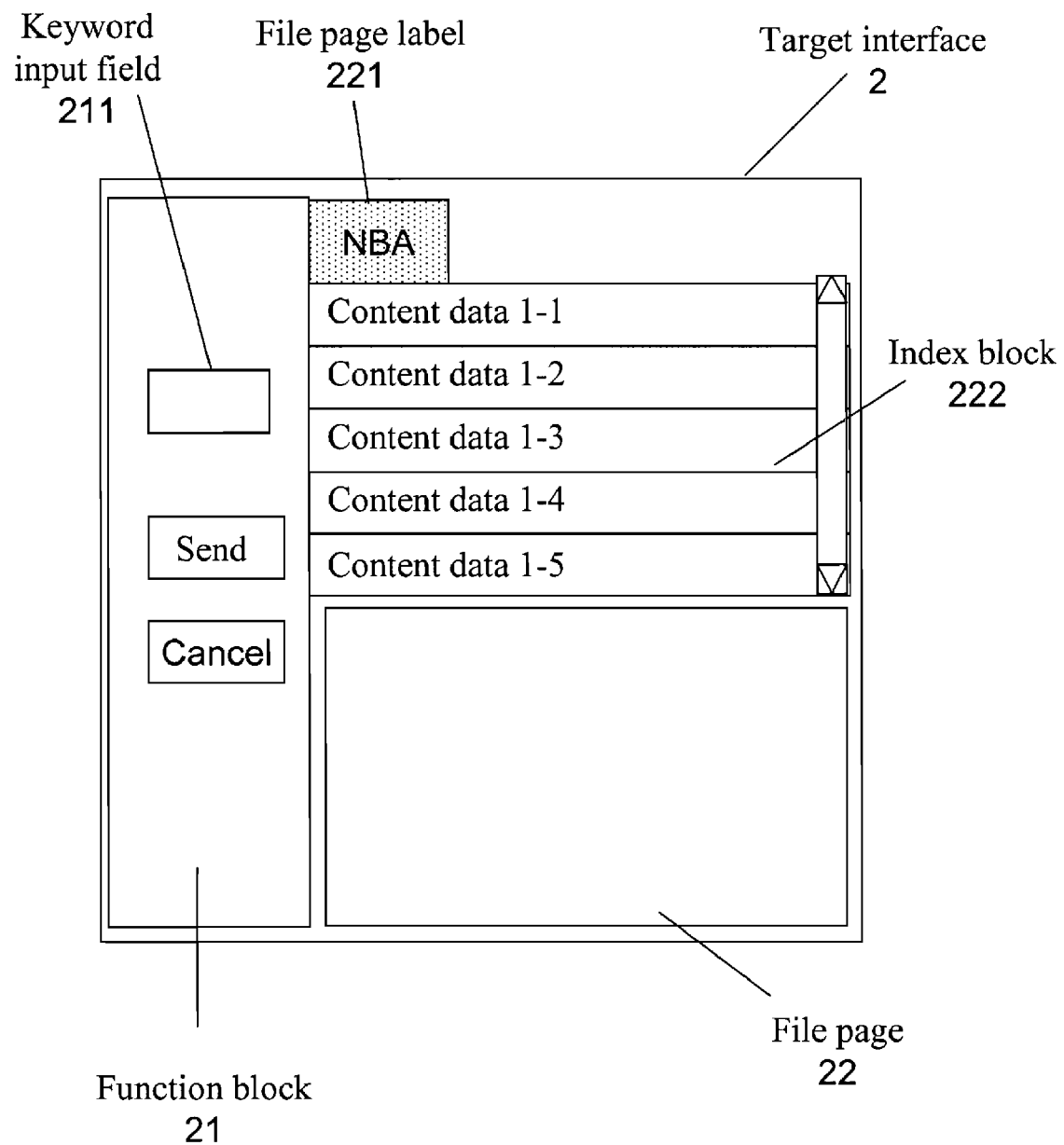
FIG. 2A is a schematic view of a target interface having multiple file pages according to an embodiment of the present invention.

An example is given below for complete illustration. First, "NBA" is input in a website search engine, and it is assumed that 100 search results satisfying the condition are obtained. At this time, in the present invention, the 100 search results of "NBA" from the website search engine are first extracted as a main result file (corresponding to Step S110). Each data of the main result file is then organized (corresponding to Step S120, a temporary set with organized content data is generated). A file page 22 having a file page label 221 as "NBA" is opened on the target interface 2, and each organized content data is presented in the index block 222 of the file page 22 (corresponding to Step S130, the content of the corresponding temporary set), as shown in FIG. 2A.

Figure 2B:
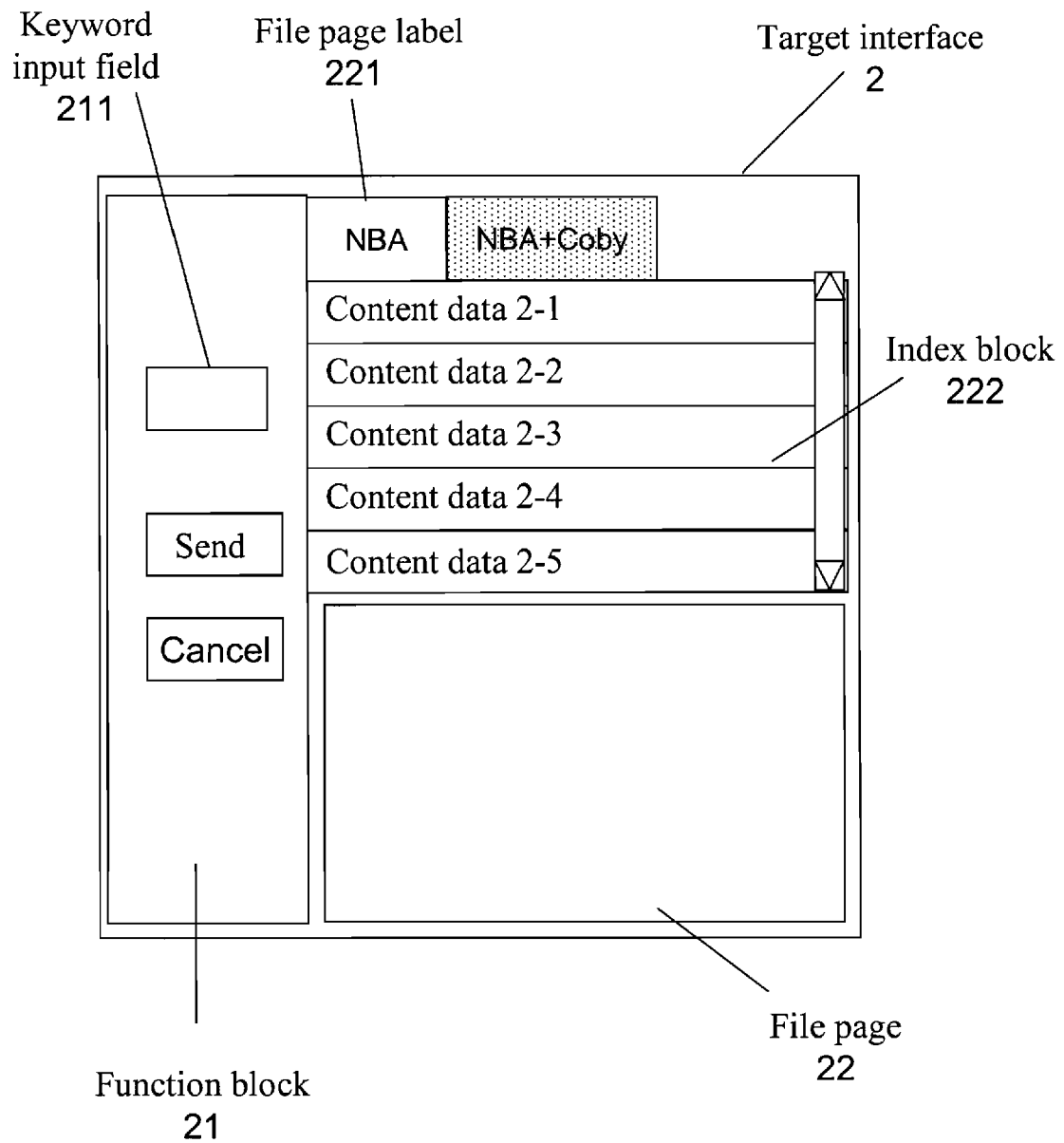
FIG. 2B is a schematic view of a display frame according to an embodiment of the present invention.

At this time, if the file page 22 of "NBA" needs to be further filtered, the file page 22 of "NBA" is selected as a main filter page (corresponding to Step S140) and a new advanced keyword "Coby" is input in the keyword input field 211 of the function block 21 (corresponding to Step S150, at least a keyword is input to perform keyword filter on the temporary sets that belong to the main filter page, so as to obtain a filter result file). Each data of the filter result file is then internally organized (corresponding to Step S160, a new temporary set corresponding to the content data of the filter result file is generated), and a new file page 22 having a file page label 221 as "NBA+Coby" is opened on the target interface 2. In the index block 222 of the file page 22, each organized content data is presented (at this time, the process returns to Step S130, and the content of the corresponding temporary set is presented in the new file page 22), as shown in FIG. 2B. As the file page label 221 of "NBA" is selected for the main filter page of the advanced filter, the new file page label 221 is presented as "NBA+Coby", so that the user is clear about which search block the file page label 221 is attached to.

Figure 2C:
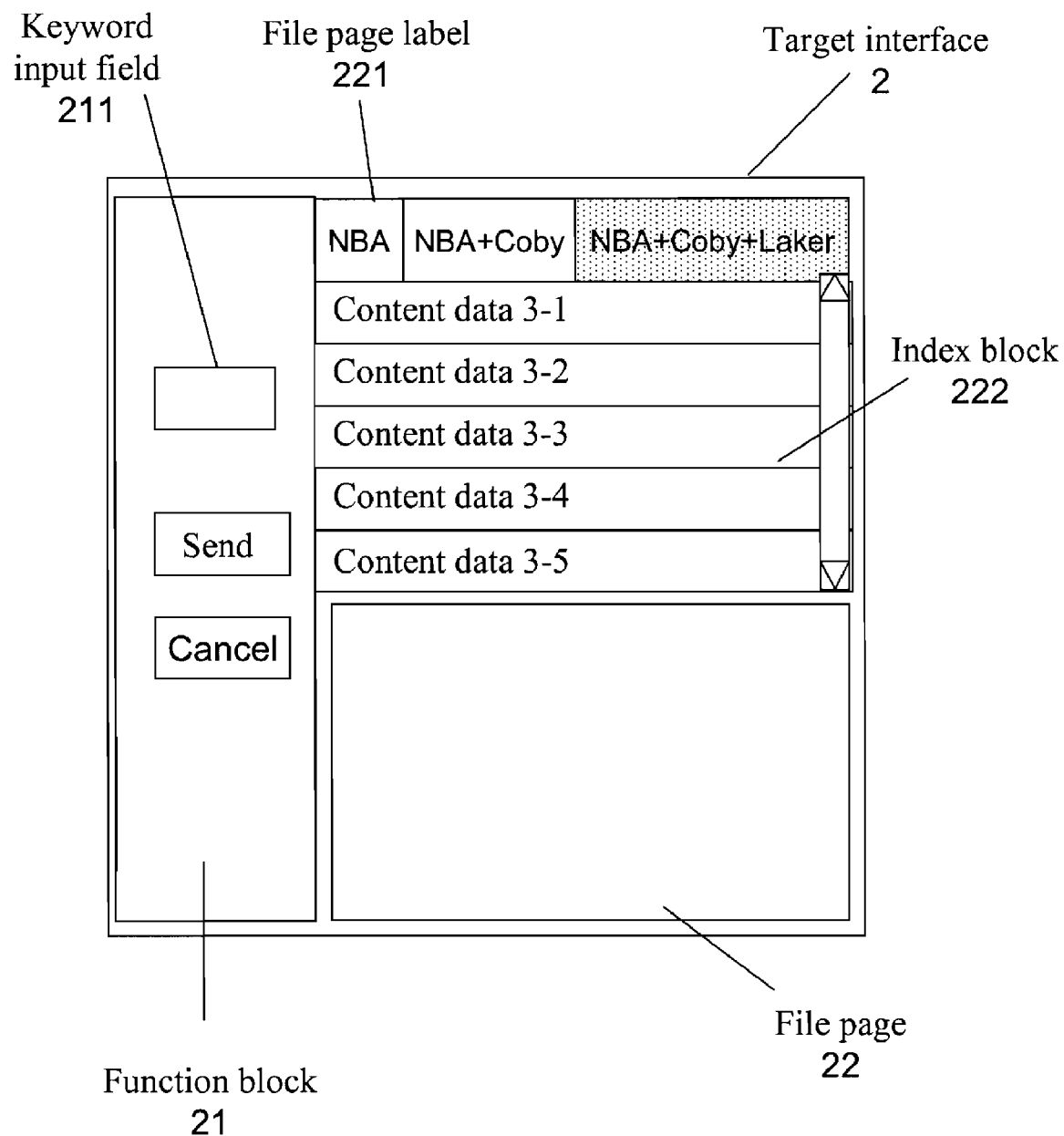
FIG. 2C is a schematic view of a display frame according to an embodiment of the present invention.
Figure 2D:
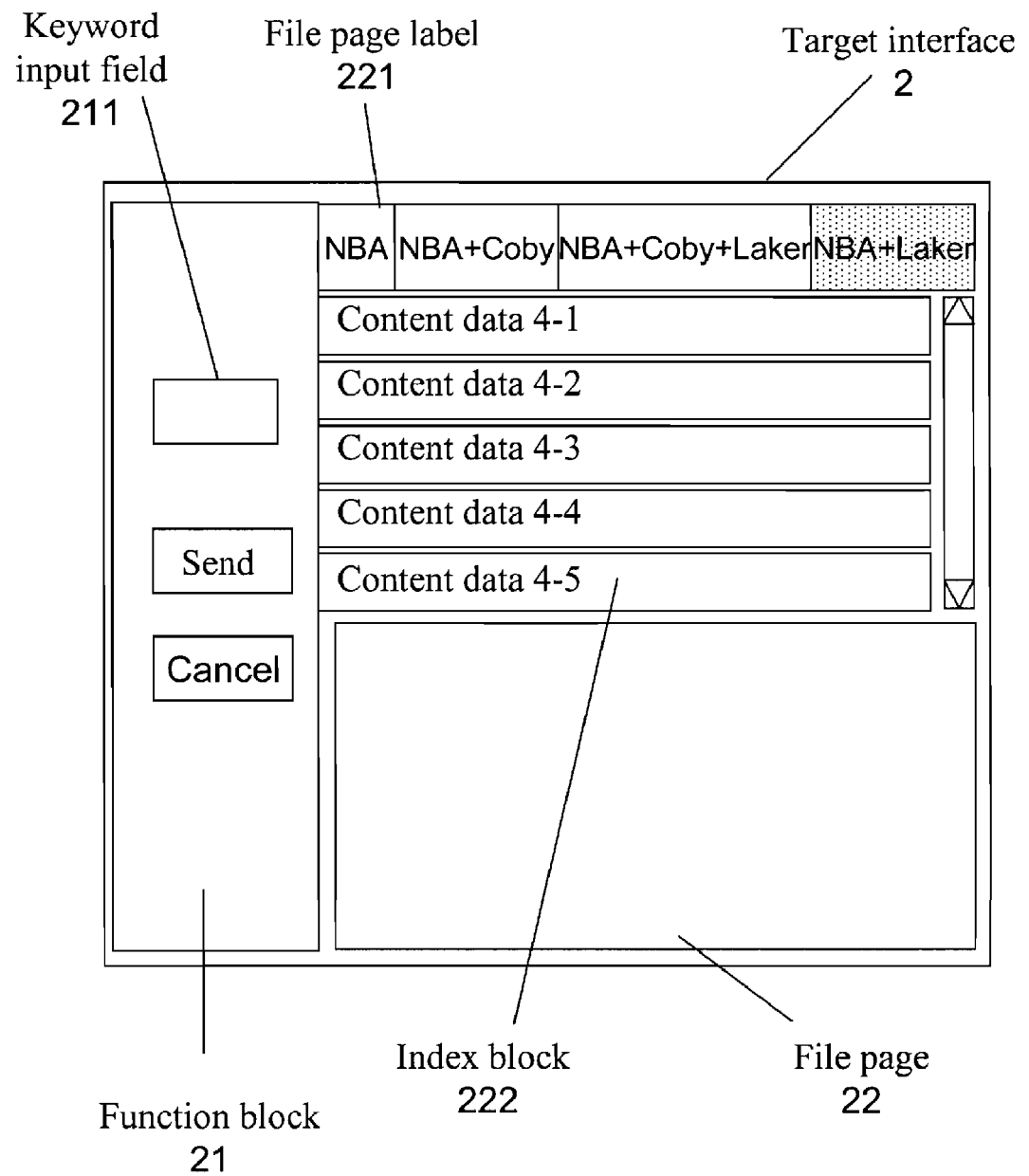
FIG. 2D is a schematic view of a display frame according to an embodiment of the present invention.

At this time, the target interface 2 has two file page labels 221 "NBA" and "NBA+Coby", and the user may select one of the two labels as a new main filter page. If the user selects the file page 22 having the file page label 221 of "NBA+Coby" as the main filter page and adopts "Laker" as a new advanced keyword for advanced keyword filter, according to the present invention, content data containing "Laker" is filtered from the temporary set of "NBA+Coby" (the actions in Steps S130 to S160 are repeated). Similarly, the file page label 221 of "NBA+Coby+Laker" and the file page 22 are also added in the target interface 2, and each organized content data is presented in the index block 222 of the file page 22 (corresponding to Step S130, the content of the corresponding temporary set), as shown in FIG. 2C. Likewise, if "NBA" is used as the main filter page and "Laker" is adopted for filter, the filter results as shown in FIG. 2D are generated. According to each filter result, a corresponding process is recorded in the target interface 2. Therefore, four file page labels 221, that is, "NBA", "NBA+Laker", "NBA+Coby+Laker", and "NBA+Laker", are displayed in the target interface 2 in FIG. 2D. Finally, the user can click different file page labels 221 to perform new filter.

The content and data of each file page 22 exist separately (in respective temporary sets) and the display (the respective file page 22 and file page label 221) can be turned off at any time. The user may also select a random file page 22 as a main filter page to perform an advanced filter action to open another file page 22 that satisfies the filter results.

Finally, after the user finishes the operation (that is, the loop of steps in the present invention is completed), all the temporary sets generated in the steps of the present invention are deleted instead of occupying the resources of the scratch-pad memory at the local end 200. Moreover, as the filter condition (the advanced keyword) and the filter results (the main result file and the filter result file) of each advanced filter in the steps of the present invention are stored independently (in respective temporary sets), the history records and results of the filter actions in the whole process are stored. In this manner, when the target interface 2 at the local end 200 is opened again, the user may decide whether to load the previous filter history, so as to reduce the time for repetitive filter, or when the target interface 2 is opened again, the previous filter history is directly loaded, so as to facilitate the subsequent advanced utilization or comparison for reference.

Figure 3A:
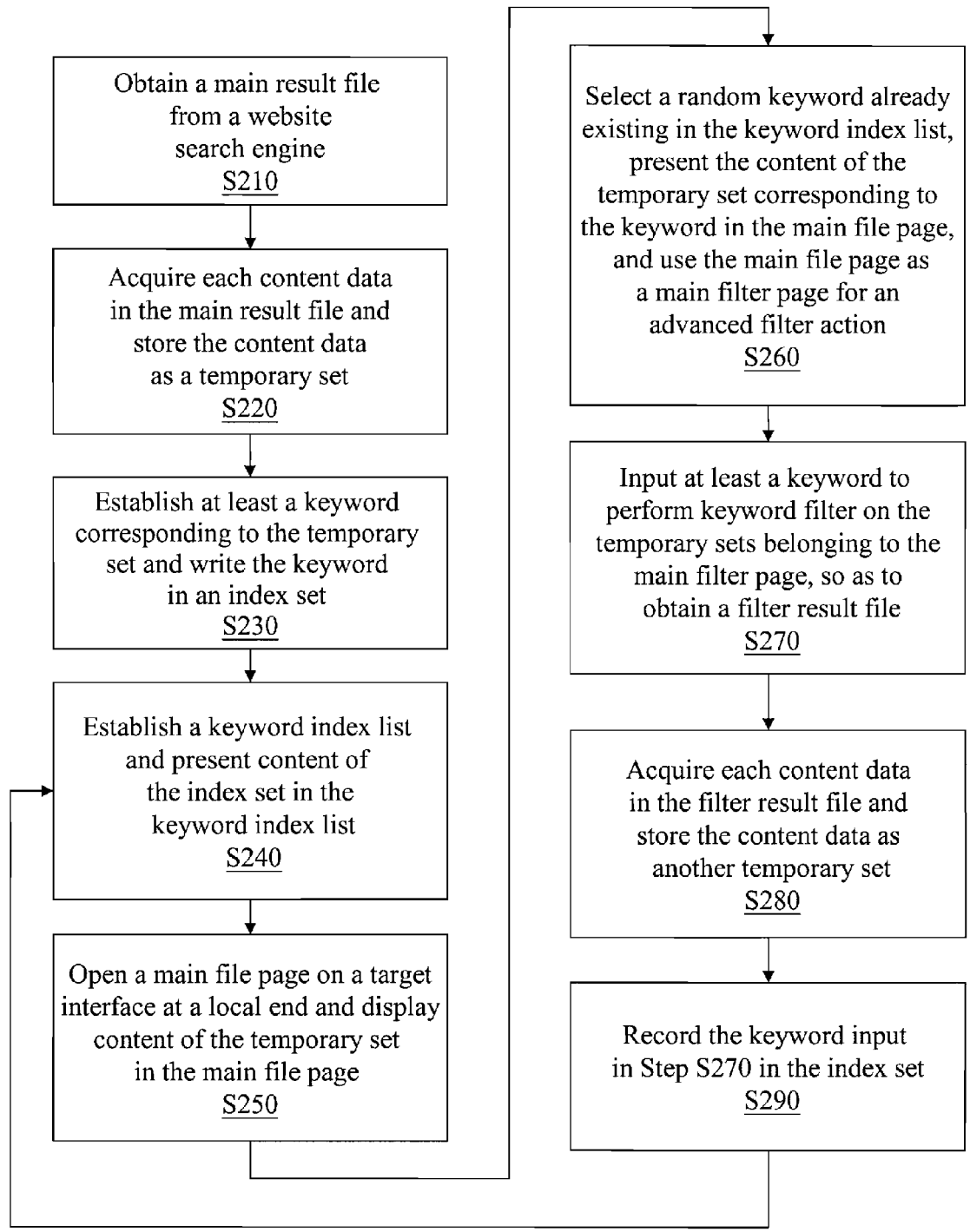
FIG. 3A is a schematic view of steps according to another embodiment of the present invention.

In addition to the above embodiment, the present invention may also be implemented in a target interface 2 of an independent page. FIG. 3A is a schematic view according to another embodiment of the present invention, and the method of this embodiment comprises the following steps.

In Step S210, a main result file is obtained from a website search engine.

In Step S220, each content data in the main result file is acquired and stored as a temporary set.

In Step S230, at least a keyword is established corresponding to the temporary set and the keyword is written in an index set.

In Step S240, a keyword index list is established and content of the index set is presented in the keyword index list.

In Step S250, a main file page is opened on a target interface at a local end and content of the temporary set is displayed in the main file page.

In Step S260, a random keyword already existing in the keyword index list is selected, the content of the temporary set corresponding to the keyword is presented in the main file page, and the main file page is used as a main filter page for an advanced filter action.

In Step S270, at least a keyword is input to perform keyword filter on the temporary sets that belong to the main filter page, so as to obtain a filter result file.

In Step S280, each content data in the filter result file is acquired and stored as another temporary set.

In Step S290, the keyword input in Step S270 is recorded in an index set, and Steps S240 to S290 are repeated.

Figure 3B:
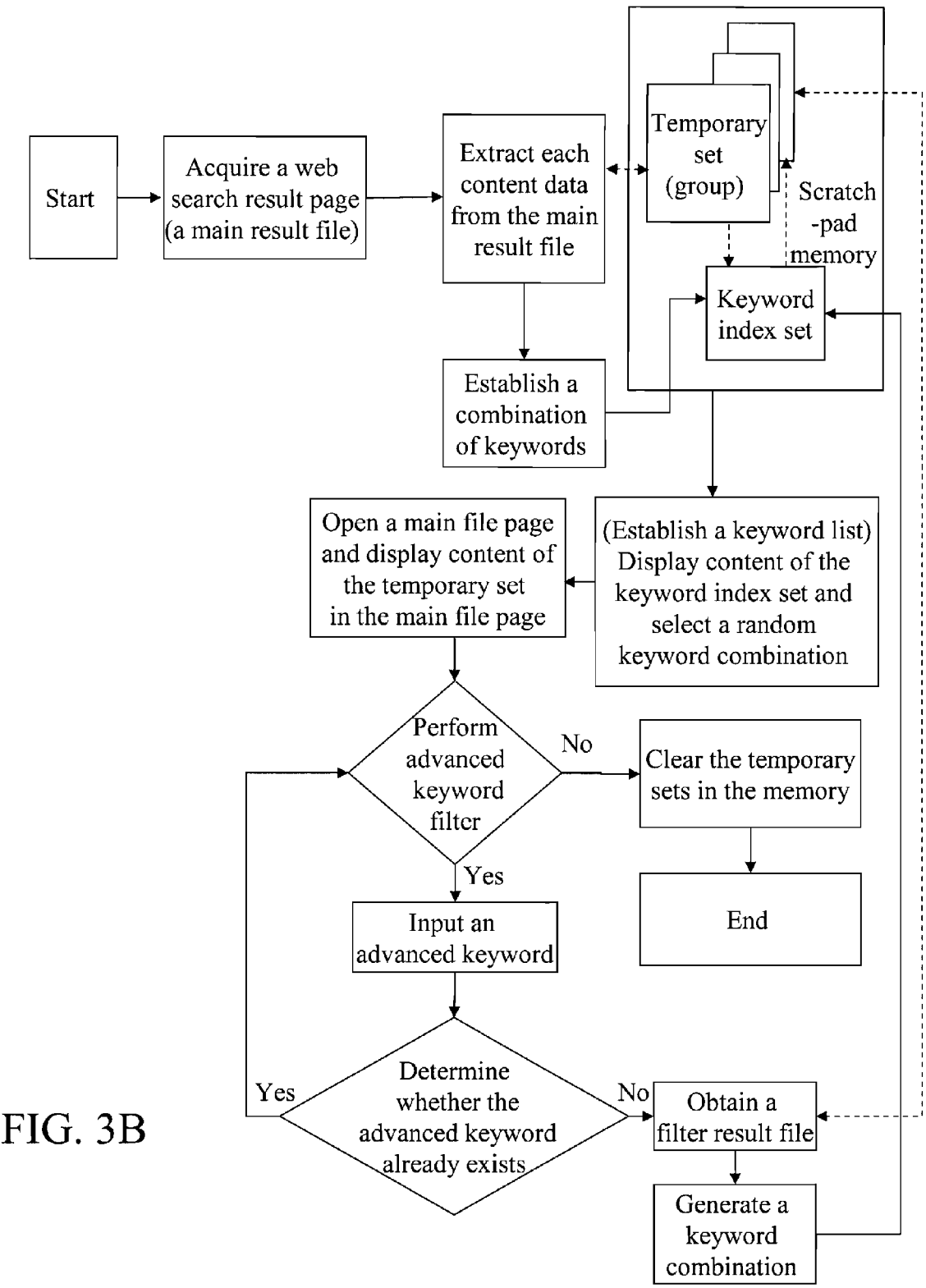
FIG. 3B is a schematic flow chart according to another embodiment of the present invention.

In this embodiment, the operation of the present invention is implemented on a target interface with a single window. In order to illustrate the operation process and architecture of the present invention more clearly, reference is also made to FIG. 3B in addition to the steps in FIG. 3A.

The relations and effects of the local end 200 and the data source end 100 are the same as above, the description of which is thus omitted herein. After the target interface at the local end 200 obtains the main result file (corresponding to Step S210), data in the main result file is organized in sequence to form content data that satisfies processing conditions (corresponding to Step S220). At the same time, the content data is stored as a temporary set and the temporary set is recorded in a scratch-pad memory at the local end 200. Similar to the above embodiment, all the temporary sets are correlated but independent from each other. In addition, in this embodiment, when the user inputs a new keyword each time, the target interface records the keyword in the index set (corresponding to Step S230). The index set is also recorded in the scratch-pad memory of the local end 200, and belongs to a block independent of that of the temporary sets.

Next, a keyword index list is established in a function block at the local end 200, and the content of the index set is presented in the keyword index list (corresponding to Step S240). A main file page is opened in the target interface. The content of the temporary set is displayed in the main file page (corresponding to Step S250). The sequence of establishing the keyword index list and the main file page is not limited herein. In other words, the target interface may also open the main file page first and then establish the keyword index list, which still falls within the scope of the present invention.

The keyword index list may be presented in any mode such as a drop-down menu, a tree structure menu, or a column list. Each item in the keyword index list represents a keyword in the index set. The user may randomly select a keyword from the existing keyword index list, the content of the temporary set corresponding to the selected keyword is presented in the main file page, and a main file page of the selected keyword is used as a main file page of an advanced filter action (corresponding to Step S260).

The main file page is then used as a new filter range. A new keyword is input to perform keyword filter on the temporary sets of the main file page and a new filter result file is obtained (corresponding to Step S270). Each contained content data is acquired according to the new filter result file generated in Step S270, and the content data is stored as another group of new temporary sets (corresponding to Step S280).

The process in Steps S240 to S280 forms a loop operation, and the user may input keywords for filter continuously. A first-time advanced filter is performed on the temporary set generated from the main result file (that is, a first main file page is generated). Temporary sets satisfying another new keyword are filtered from the temporary sets of the first main file page (that is, another main file page is generated). Therefore, the present invention can select a different keyword in the keyword index list as a range for the next filter. The new keyword is then recorded in the keyword index list and the content of the new temporary set is displayed in the corresponding main file page.

Each item in the keyword index list may be marked as "advanced keyword" or "predetermined filter condition+advanced keyword". When the user selects a random item in the keyword index list, the content data of the selected keyword is displayed in the main file page.

Finally, after the user finishes the operation (that is, the loop of steps in the present invention is completed), all the temporary sets generated in the steps of the present invention are deleted instead of occupying the resources of the scratch-pad memory at the local end 200. Moreover, as the filter condition (the advanced keyword) and the filter results (the main result file and the filter result file) of each advanced filter in the steps of the present invention are stored independently (in respective temporary sets), the history records and results of the filter actions in the whole process are stored. In this manner, when the target interface is opened again, the user may decide whether to load the previous filter history, so as to reduce the time for repetitive filter, or when the target interface is opened again, the previous filter history is directly loaded, so as to facilitate the subsequent advanced utilization or comparison for reference.

Figure 4A:
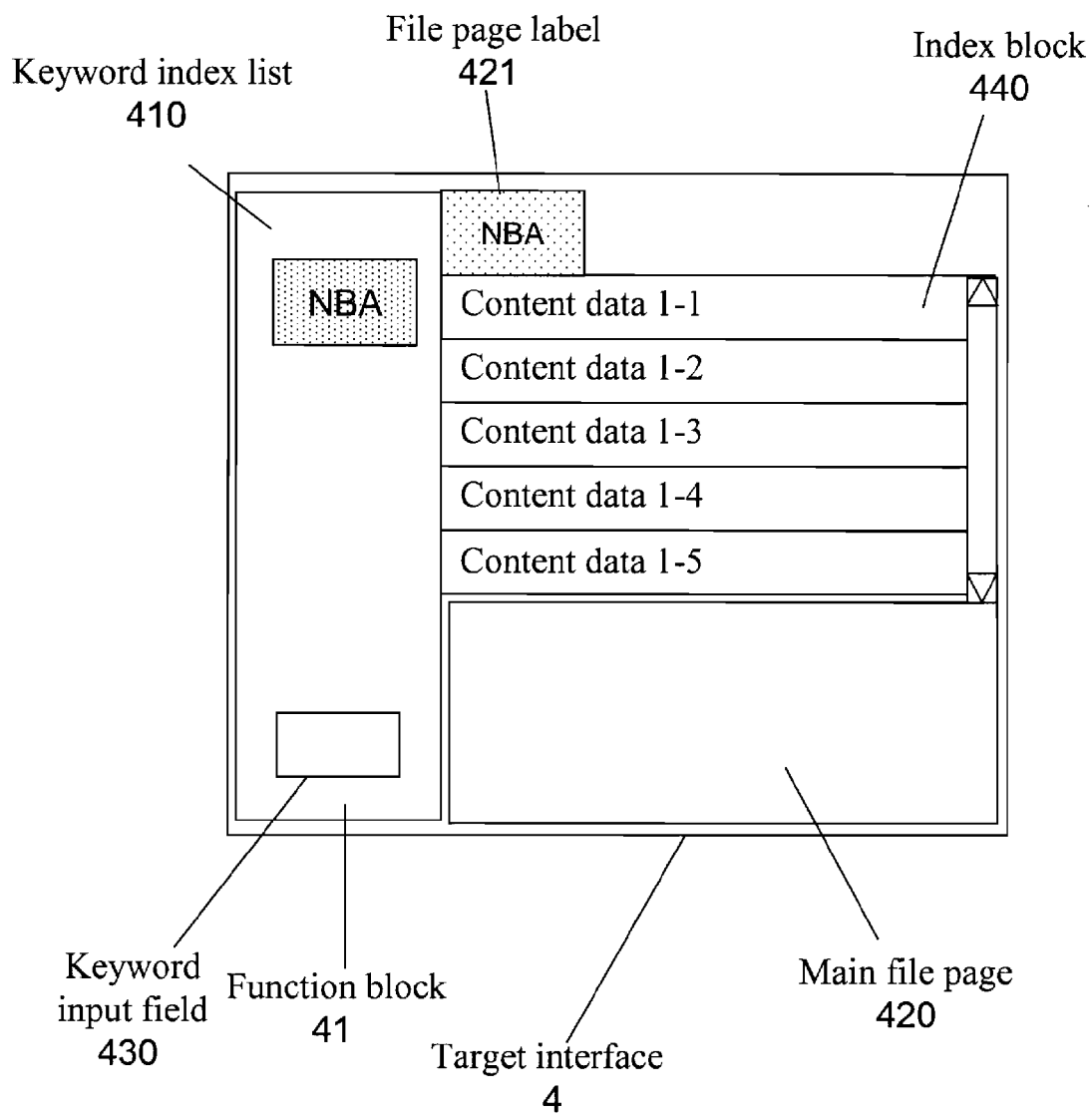
FIG. 4A is a schematic view of a target interface of a main file page according to another embodiment of the present invention.
Figure 4B:
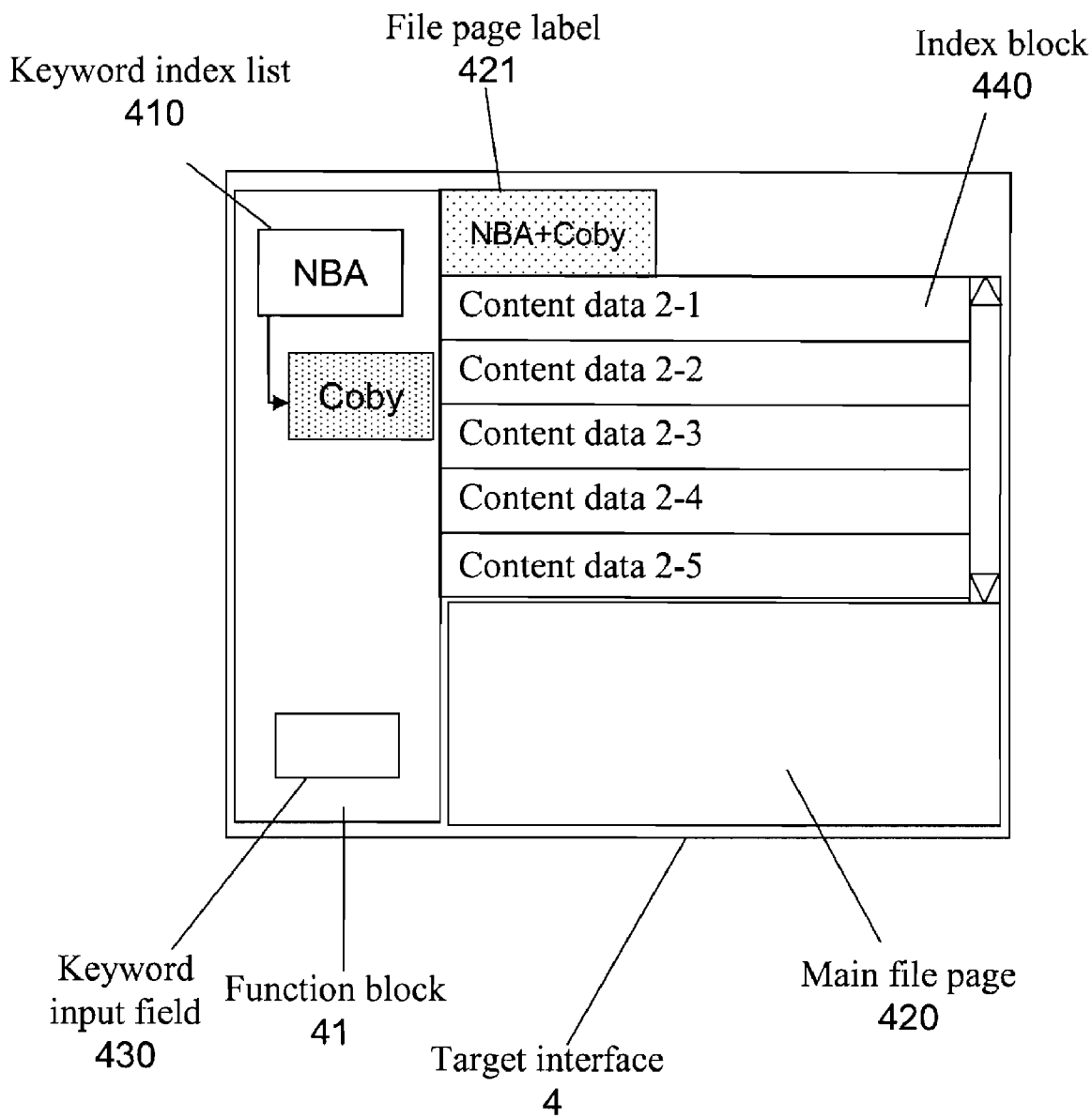
FIG. 4B is a schematic view of a display frame according to another embodiment of the present invention.

In order to illustrate the operation mode of this embodiment clearly, a frame of a target interface 4 is used for illustration with reference to FIGS. 4A to 4B. In the target interface 4 in FIG. 4A, a function block 41 is on the left side and a main file page 420 is on the right side. The function block 41 further has a text input box and a keyword index list 410. The main file page has an index block 440. The text input box serves as an input interface for newly added keywords, and the text input box is defined as a keyword input field 430 herein. The keyword index list 410 may be a drop-down menu or a tree structure menu. The keyword index list 410 has multiple groups of items. Each item represents a keyword (or a combination sequence of keywords). When a user clicks a random item in the keyword index, the content data of the temporary sets are displayed in a list one by one in the index block 440. The displayed content comprises each content data with a title, an abstract, and a URL in the temporary set.

First, "NBA" is input in the website search engine, and it is assumed that 100 search results satisfying the condition are obtained. At this time, in the present invention, the 100 search results of "NBA" from the website search engine are first extracted as a main result file (corresponding to Step S210). Each data of the main result file is then organized to generate a corresponding temporary set (corresponding to Step S220). Meanwhile, "NBA" is added in the keyword index list 410 and the index set at the local end (corresponding to Step S230). The content of the temporary set generated in Step S220 is displayed in the main file page and the content of the index set is displayed in the keyword index list 410, as shown in FIG. 4A (corresponding to Steps S240 and S250 respectively). The text "NBA" is displayed in the file page label 421 of the main file page 420.

Next, when the main file page 420 of "NBA" is further filtered, "NBA" in the keyword index list 410 is clicked to serve as a main file page 420 (corresponding to Step S260). A new advanced keyword "Coby" is input in the keyword input field 430 of the function block 41.

After that, content data that satisfies "Coby" is filtered from the temporary set of "NBA" at the local end 200, and a new temporary set is generated. The keyword "Coby" is added in the keyword index list 410 (and the index set) (that is, Steps S240 to S290 are repeated). According to different structures of the keyword index list 410, each item in the keyword index list 410 also has different display modes. For example, if the keyword index list 410 is displayed as a drop-down menu, the item is displayed as "NBA+Coby" or "NBA→Coby". If the keyword index list 410 is displayed as a tree structure menu, each node in the tree structure menu represents a different keyword. Therefore, the user may easily figure out subordination between the current keyword and the previous keyword through the parent-child relation in the tree structure. At the same time, the local end 200 modifies the text in the file page label 421 into "NBA+Coby".

Figure 4C:
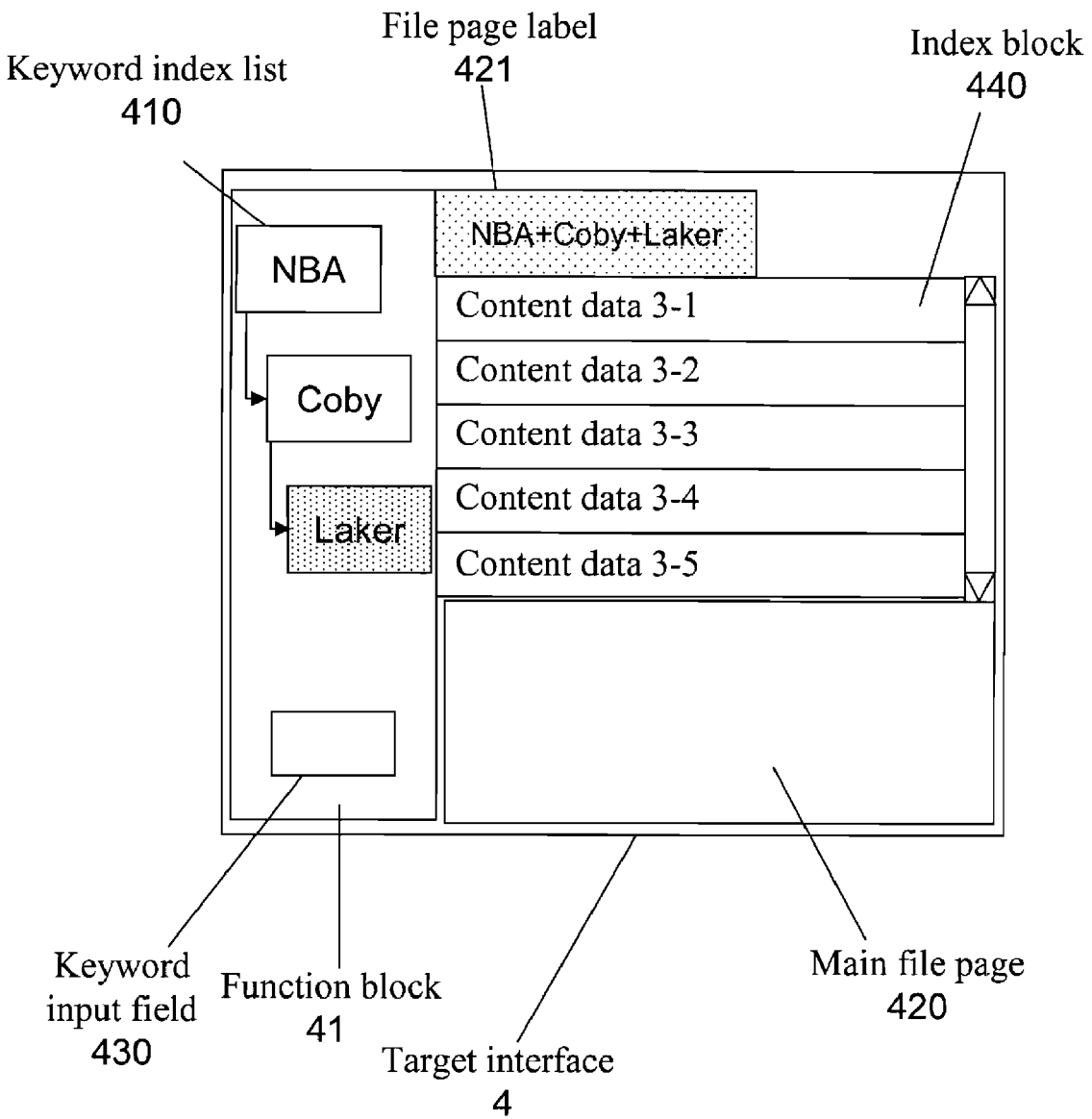
FIG. 4C is a schematic view of a display frame according to another embodiment of the present invention.
Figure 4D:
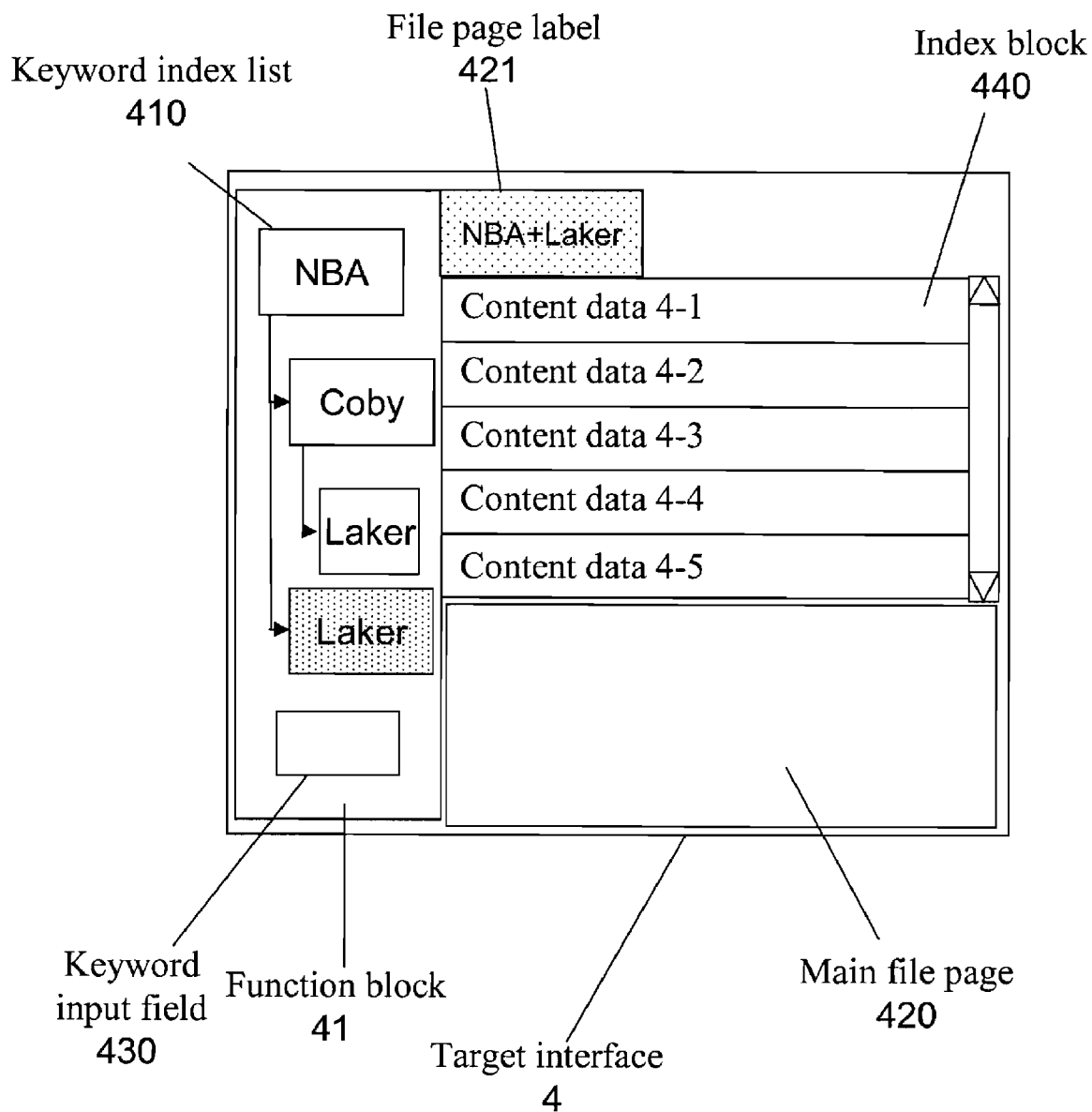
FIG. 4D is a schematic view of a display frame according to another embodiment of the present invention.

Since the keyword index list 410 already has two keywords "NBA" and "NBA+Coby", the user may select one of the two labels as a new main file page 420. If the user selects "NBA+Coby" as the main file page 420 and adopts "Laker" as a new advanced keyword for advanced keyword filter, according to the present invention, content data containing "Laker" is filtered from the temporary set of "NBA+Coby" (the actions in Steps S240 to S290 are repeated). The user selects "NBA+Coby" from the keyword index list 410 as the main file page 420 and inputs "Laker" to perform advanced keyword filter. After Steps S240 to S290, the content of the temporary set of "NBA+Coby+Laker" is displayed in the index block 440, and "NBA+Coby+Laker" is displayed in the file page label 421, as shown in FIG. 4C. After the above filter is completed, if "NBA" is used as the main file page 420 and "Laker" is adopted for filter, the filter results as shown in FIG. 4D are generated. As the history of each filter is recorded, the four keywords, that is, "NBA", "NBA+Coby", "NBA+Coby+Laker", and "NBA+Laker", are recorded in the keyword index list 410 in FIG. 4D.

Finally, after the operation of the present invention is finished, all the temporary sets generated in the steps of the present invention are deleted instead of occupying the resources of the scratch-pad memory at the local end 200. Alternatively, the filter condition (the advanced keyword) and the filter results (the main result file and the filter result file) of each advanced filter in the steps of the present invention are stored independently (in respective temporary sets). In this manner, when the target interface 4 is opened again, the previous filter history may be selectively loaded, so as to reduce the time for repetitive filter, or when the target interface 4 is opened again, the previous filter history is directly loaded, so as to facilitate the subsequent advanced utilization or comparison for reference.

In view of the above, the present invention provides a method for implementing advanced filter on file clusters, in which a new file page is opened to present respective advanced filter results, and the filtered results can be further filtered.

What is claimed is:

1. A method for filtering file clusters, wherein a plurality of advanced filter actions with different filter conditions and independent from each other is performed on content of a main result file corresponding to a keyword, so as to keep a history record and respective search results of each advanced filter and present the history record and search results on a target interface, the method comprising:
    (a) obtaining the main result file from a data source end;
    (b) acquiring each content data in the main result file and storing the content data as a temporary set, wherein each content data in the main result file satisfies the keyword;
    (c) opening a new file page on the target interface at a local end and displaying content of the temporary set in the file page;
    (d) selecting a random file page from the target interface as a parent filter page, using the temporary set belonging to the parent filter page as a parent temporary set, and using the keyword belonging to the parent filter page as a predetermined filter condition;
    (e) inputting at least one advanced keyword to perform keyword filter on the parent temporary set belonging to the parent filter page, so as to obtain a filter result file corresponding to both the predetermined filter condition and the advanced keyword, wherein the predetermined filter condition and the advanced keyword form a tree structure;
    (f) acquiring each content data in the filter result file, storing the content data as another temporary set, wherein each content data in the filter result file satisfies both the predetermined filter condition and the advanced keyword; and
    (g) opening another new file page on the target interface at the local end, displaying content data of the another temporary set in the another file page, and repeating steps (d) to (g).

2. The method for filtering file clusters according to claim 1, wherein the target interface is a web browser or an application.

3. The method for filtering file clusters according to claim 1, wherein the data source end is a website search engine, a server, or the local end.

4. The method for filtering file clusters according to claim 1, wherein the content data comprises a title, an abstract, and a uniform resource locator (URL).

5. The method for filtering file clusters according to claim 1, wherein the temporary sets are independently stored in a memory block respectively.

6. The method for filtering file clusters according to claim 1, wherein the corresponding keyword or a combination of the keywords is further recorded in each file page.

7. A method for filtering file clusters, wherein a plurality of advanced filter actions with different filter conditions and independent from each other is performed on search results of a website search engine, so as to keep a history record and respective search results of each advanced filter and present the history record and search results on a target interface, the method comprising:
    (a) obtaining a main result file from the website search engine;
    (b) acquiring each content data in the main result file and storing the content data as a temporary set;
    (c) establishing at least a keyword corresponding to the temporary set and writing the keyword in an index set, wherein each content data in the temporary set satisfies the keyword;
    (d) establishing a keyword index list and presenting content of the index set in the keyword index list;
    (e) opening a main file page on the target interface at a local end and displaying content of the temporary set in the main file page;
    (f) selecting a random keyword from the keyword index list as a parent key, presenting the content of a parent temporary set corresponding to the parent keyword in the main file page, and using the main file page as a main filter page for advanced filter;
    (g) inputting at least one advanced keyword to perform keyword filter on the parent temporary set belonging to the main filter page, so as to obtain a filter result file corresponding to both the parent keyword and the advanced keyword, wherein the parent keyword and the advanced keyword form a tree structure;
    (h) acquiring each content data in the filter result file and storing the content data as another temporary set, wherein each content data in the filter result file satisfies both the parent keyword and the advanced keyword; and
    (i) recording the advanced keyword input in step (g) in the index set, re-presenting content of the index set in the keyword index list, and repeating steps (e) to (i).

8. The method for filtering file clusters according to claim 7, wherein the target interface is a web browser.

9. The method for filtering file clusters according to claim 7, wherein the content data comprises a title, an abstract, and a uniform resource locator (URL).

10. The method for filtering file clusters according to claim 7, wherein each temporary set is corresponding to an independent memory block.

11. The method for filtering file clusters according to claim 7, wherein the keyword index list is one of a drop-down menu, a tree structure menu, and a column list.

* * * * *